(12) United States Patent
Harris

(10) Patent No.: US 7,576,962 B2
(45) Date of Patent: Aug. 18, 2009

(54) TRANSIENT BLOCKING APPARATUS WITH RESET

(75) Inventor: Richard A. Harris, Palo Alto, CA (US)

(73) Assignee: Bourns, Inc., Riverside, CA (US)

( * ) Notice: Subject to any disclaimer, the term of this patent is extended or adjusted under 35 U.S.C. 154(b) by 236 days.

(21) Appl. No.: 11/445,774

(22) Filed: Jun. 2, 2006

(65) Prior Publication Data

US 2006/0285264 A1    Dec. 21, 2006

Related U.S. Application Data

(60) Provisional application No. 60/691,415, filed on Jun. 16, 2005.

(51) Int. Cl.
*H02H 3/22* (2006.01)
(52) U.S. Cl. .................................. 361/58; 361/111
(58) Field of Classification Search .................. 361/56, 361/91.1, 111, 58
See application file for complete search history.

(56) References Cited

U.S. PATENT DOCUMENTS

| | | | | |
|---|---|---|---|---|
| 3,521,087 A * | 7/1970 | Lombardi | ................... | 327/322 |
| 3,916,220 A | 10/1975 | Roveti | ........................ | 307/251 |
| 4,533,970 A * | 8/1985 | Brown | ........................ | 361/58 |
| 5,130,262 A | 7/1992 | Masquelier et al. | ........... | 437/31 |
| 5,196,980 A | 3/1993 | Carson | | |
| 5,319,515 A | 6/1994 | Pryor et al. | .................... | 361/93 |
| 5,625,519 A | 4/1997 | Atkins | ......................... | 361/93 |
| 5,696,659 A | 12/1997 | Maruo | ........................ | 361/93 |
| 5,729,418 A | 3/1998 | Lei | .............................. | 361/58 |
| 5,742,463 A | 4/1998 | Harris | ......................... | 361/88 |
| 5,789,900 A | 8/1998 | Hasegawa et al. | ........... | 320/132 |
| 5,929,665 A | 7/1999 | Ichikawa et al. | ............. | 327/109 |
| 5,946,175 A * | 8/1999 | Yu | .............................. | 361/56 |
| 6,002,566 A | 12/1999 | Arikawa et al. | ............. | 361/93.1 |
| 6,118,641 A | 9/2000 | Atkins et al. | .................. | 361/18 |
| 6,157,529 A | 12/2000 | Ahuja | ........................ | 361/111 |
| 6,313,610 B1 | 11/2001 | Korsunsky | .................. | 320/134 |
| 6,331,763 B1 | 12/2001 | Thomas et al. | .............. | 320/136 |
| 6,351,360 B1 | 2/2002 | Kotowski et al. | ............ | 361/103 |

(Continued)

FOREIGN PATENT DOCUMENTS

AU        A-75035/91        11/1991

(Continued)

*Primary Examiner*—Danny Nguyen
(74) *Attorney, Agent, or Firm*—Lumen Patent Firm

(57) ABSTRACT

A method and apparatus for transient blocking relying on a transient blocking device and a sampling circuit. The transient blocking device has at least one depletion mode n-channel device interconnected with at least one depletion mode p-channel device such that a transient alters a bias voltage $V_p$ of the depletion mode p-channel device and a bias voltage $V_n$ of the depletion mode n-channel device in such a manner that the depletion mode devices mutually switch off to block the transient. The sampling circuit is interconnected with the depletion mode p-channel device and the depletion mode n-channel device to determine whether the transient persists. In the event of a persistent transient, the sampling circuit uses a disconnect element for permanently blocking the transient blocking device. Various types of voltage pinching and disconnect elements, including depletion mode devices of the n-channel and p-channel type can be employed in the sampling circuit to sample the transient and permanently block the transient blocking device.

16 Claims, 4 Drawing Sheets

U.S. PATENT DOCUMENTS

| | | |
|---|---|---|
| 6,518,731 B2 | 2/2003 | Thomas et al. .............. 320/136 |
| 6,714,393 B2 | 3/2004 | Nostrand ..................... 361/58 |
| 6,768,623 B1 | 7/2004 | Shen ........................ 361/93.9 |
| 6,855,988 B2 | 2/2005 | Madurawe .................. 257/347 |
| 6,861,828 B2 | 3/2005 | Watanabe ................... 323/282 |
| 6,865,063 B2 | 3/2005 | Ball .......................... 361/93.9 |
| 6,879,478 B2 | 4/2005 | Mendoza et al. |
| 6,914,416 B2 | 7/2005 | Thomas et al. .............. 320/136 |
| 6,948,078 B2 | 9/2005 | Odaohhara .................. 713/300 |
| 6,958,591 B1 | 10/2005 | Smith ........................ 320/163 |
| 6,970,337 B2 | 11/2005 | Strahm ....................... 361/58 |
| 7,324,315 B2 * | 1/2008 | Harris ......................... 361/58 |
| 2001/0021092 A1 | 9/2001 | Astala ......................... 361/90 |

FOREIGN PATENT DOCUMENTS

| | | |
|---|---|---|
| EP | 0818867 | 1/1998 |
| GB | 2294598 | 1/1995 |
| WO | WO9501667 | 1/1995 |
| WO | WO0101539 | 1/2001 |
| WO | WO03069753 | 8/2003 |
| WO | WO2004006408 | 1/2004 |
| WO | WO2004034544 | 4/2004 |

* cited by examiner

US 7,576,962 B2

TRANSIENT BLOCKING APPARATUS WITH RESET

RELATED APPLICATIONS

The present application claims priority from provisional U.S. application 60/691,415 that was filed on 16 Jun. 2005 and is herein incorporated in its entirety.

FIELD OF THE INVENTION

This invention relates generally to a transient blocking apparatus and methods that employ relays in conjunction with depletion mode devices for uni-directional and bi-directional protection against transients.

BACKGROUND ART

Many circuits, networks, electrical devices and data handling systems are operated in configurations and environments where external factors can impair their performance, cause failure or even result in permanent damage. Among the most common of these factors are over-voltage and over-current transients. Protection against these is important and has been addressed in the prior art in a number of ways, depending on the specific electronics and their application.

Fuses that employ thermal or magnetic elements are one common protection measure. For example, some circuits employ relays in their systems to cause protective blocking in either direction. Exemplary prior art protection circuits that use relays, including circuits with MOSFETs, include U.S. Pat. Nos. 4,453,191; 4,484,245; 5,536,980; 5,926,354; 6,373,670; 6,759,835 and 6,891,705.

Protection circuits are further specialized depending on conditions and application. For example, in the case of protecting batteries or rechargeable elements from overcharging and over-discharging one can refer to circuit solutions described in U.S. Pat. Nos. 5,789,900; 6,313,610; 6,331,763; 6,518,731; 6,914,416; 6,948,078; 6,958,591 and U.S. Published Application 2001/0021092. Still other protection circuits, e.g., ones associated with power converters for IC circuits and devices that need to control device parameters and electric parameters simultaneously also use these elements. Examples can be found in U.S. Pat. Nos. 5,929,665; 6,768,623; 6,855,988; 6,861,828.

When providing protection for very sensitive circuits, such as those encountered in telecommunications the performance parameters of the fuses and protection circuits are frequently insufficient. A prior art solution which satisfies a number of the constraints and is embodied in a transient blocking unit (TBU) is taught in international applications PCT/AU94/00358; PCT/AU04/00117; PCT/AU03/00175; PCT/AU03/00848 as well as U.S. Pat. Nos. 4,533,970; 5,742,463 and related literature cited in these references.

One significant limitation of the TBU is that it does not have the capability of resetting itself in response to short-lived transients, such as those caused by lightning, or staying blocked in response to persisting transients or permanent over-voltage or over-current conditions. In fact, the TBU has no provisions for distinguishing between short-lived and persisting transients. It would thus be an advance to provide a TBU with a reset function that recognizes the various types of transients and controls the TBU accordingly.

OBJECTS AND ADVANTAGES

In view of the above prior art limitations, it is an object of the invention to provide a transient blocking apparatus with the capability of distinguishing short-lived transients and persistent transients.

It is another object of the invention to ensure that the apparatus employs the knowledge of the duration of the transient to either reset itself or stay permanently blocked.

It is still another object of the invention to provide for a reset function in a TBU that is either uni-directional or bi-directional.

These and other objects and advantages of the invention will become apparent from the ensuing description.

SUMMARY OF THE INVENTION

The objects and advantages of the invention are addressed by an apparatus for transient blocking made up of a transient blocking device and a sampling circuit. The transient blocking device has at least one depletion mode n-channel device interconnected with at least one depletion mode p-channel device such that a transient alters a bias voltage $V_p$ of the depletion mode p-channel device and a bias voltage $V_n$ of the depletion mode n-channel device in such a manner that the depletion mode devices mutually switch off to block the transient. The sampling circuit is interconnected with the depletion mode p-channel device and the depletion mode n-channel device for unblocking the transient blocking device.

In a preferred embodiment the sampling circuit samples the transient at a certain sampling time. The sampling circuit can employ an RC circuit or some other timing control circuit for controlling the duration of the sampling time. The sampling circuit has a voltage pinching element such as, for example a depletion mode n-channel element that is interconnected with the p-channel device for shorting the depletion mode p-channel device at the start of the sampling time. In case the transient persists, the sampling circuit uses a disconnect element that is interconnected with the voltage pinching element for permanently blocking the transient blocking device at the end of the sampling time. The disconnect element can be embodied by various components or circuits, including a depletion mode p-channel device.

In some embodiments the transient blocking apparatus is bi-polar or bi-directional, meaning that it can block forward and reverse transients. To perform this function the apparatus has an additional depletion mode n-channel device that is interconnected in the transient blocking device.

A method for transient blocking calls for providing a transient blocking device that has at least one depletion mode n-channel device and at least one depletion mode p-channel device that are interconnected such that a transient alters a bias voltage $V_p$ of the depletion mode p-channel device and a bias voltage $V_n$ of the depletion mode n-channel device to cause these devices to mutually switch off and block the transient. The depletion mode devices of the transient blocking unit are interconnected with a sampling circuit to enable a step of unblocking the transient blocking device.

In a preferred embodiment of the method, the sampling circuit samples the transient at a certain sampling time of controlled duration. This duration can be controlled, for example, with an RC circuit. The temporary unblocking can be effectuated by shorting the depletion mode p-channel device using a voltage pinching element. The temporary unblocking of the transient blocking device and sampling are performed to check whether the transient is persistent or not. In the case that the transient persists the transient blocking device is permanently blocked.

The method can be extended to bi-directional transient blocking by interconnecting an additional depletion mode n-channel device with the transient blocking device so that it can block a reverse transient, i.e., a transient of opposite polarity. A detailed description of the preferred and alternative embodiments of the invention are presented below in reference to the appended drawing figures.

BRIEF DESCRIPTION OF THE DRAWING FIGURES

DETAILED DESCRIPTION

Figure 1:
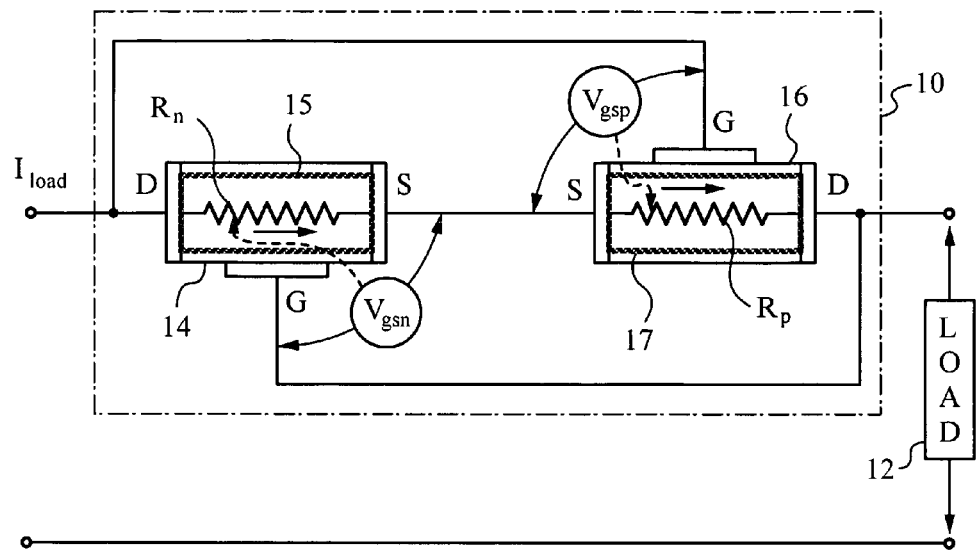
FIG. 1 is a diagram illustrating the basic principle of operation of a prior art uni-directional transient blocking unit (TBU).

The present invention and its principles will be best understood by first reviewing prior art uni-directional and bi-directional transient blocking units (TBUs) designed for over-voltage and over-current protection. The diagram in FIG. 1 shows a prior art TBU 10 for protecting a load 12 from voltage and/or current transients of one polarity, i.e., positive voltage spikes or surges. For this reason, TBU 10 is called uni-directional. TBU 10 uses a depletion mode n-channel device 14 and a depletion mode p-channel device 16, both of which can be implemented by field effect transistors (FETs). Devices 14, 16 are interconnected to take advantage of their n-channel and p-channel biasing and resistance properties to cause mutual switch off to block the transient.

More specifically, devices 14, 16 have corresponding n- and p-channels 15, 17 as well as gate G, source S and drain D terminals. Resistances $R_n$, $R_p$ of devices 14, 16 are low when voltage differences or bias voltages $V_{gsn}$ and $V_{gsp}$ between their gate G and source S terminals are zero. Normally, TBU 10 is unblocked and devices 14, 16 act as small resistors that allow a load current $I_{load}$ to pass to load 12. Application of negative bias $V_{gsn}$ to n-channel device 14 and positive bias $V_{gsp}$ to p-channel device 16 increases resistances $R_n$, $R_p$, as indicated by the arrows and turns devices 14, 16 off. The interconnection of devices 14, 16 source-to-source and gate-to-drain reinforces the process of biasing both devices "off" in response to a transient. Specifically, as load current $I_{load}$ increases device 16 develops a larger voltage drop across it, thus increasing negative bias $V_{gsn}$ applied to device 14 and consequently increasing resistance $R_n$. Higher resistance $R_n$ increases positive bias $V_{gsp}$ on device 16 thereby increasing $R_p$. Thus, the transient alters bias voltages $V_{gsn}$ and $V_{gsp}$ in concert, such that devices 14, 16 mutually increase their resistances $R_n$, $R_p$ and switch "off", and thus TBU 10 blocks the transient.

Figure 2:
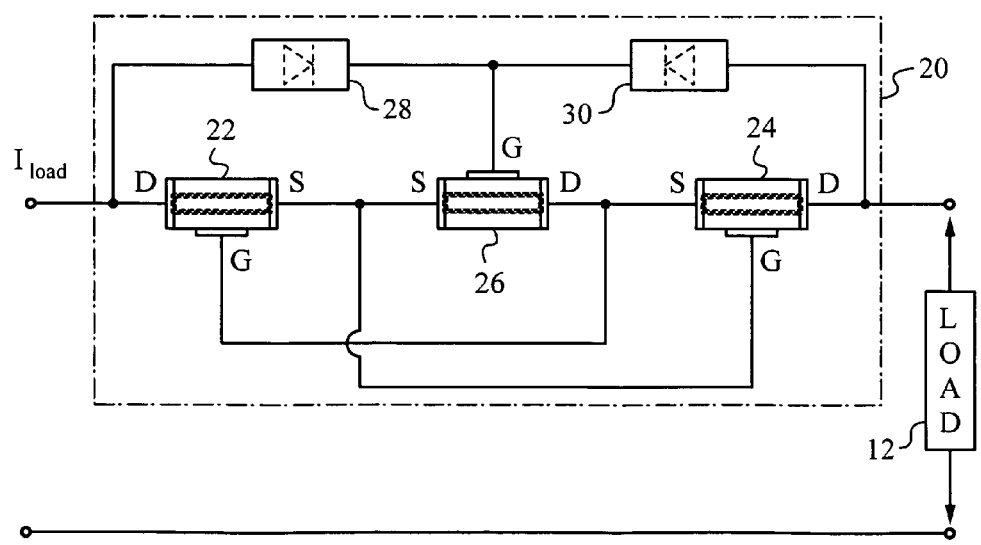
FIG. 2 is a diagram illustrating the basic principle of operation of a prior art bi-directional TBU.

The above principle of interconnection of n- and p-channel devices to achieve mutual switch-off (sometimes also referred to as mutual pinch-off) is extended to bi-directional TBUs by using two uni-directional TBUs with one configured in reverse to block negative spikes. A simpler, bi-directional TBU 20 that protects load 12 from negative and positive spikes, is shown in FIG. 2. TBU 20 has two n-channel devices 22, 24 and one p-channel device 26. Devices 22, 24, 26 are interconnected between their gate G, source S and drain D terminals as shown. Two current limiters 28, 30 are used to ensure appropriate routing of current between devices 22, 24, 26. Current limiters 28, 30 can be diodes, resistors, transistors, current sources or combinations thereof. TBU 20 causes mutual switch off of devices 22, 24, 26 in response to a negative or positive spike by employing the principles of controlling resistances by biasing in response to transients as explained above.

In fact, the prior art teaches a number of variants of TBUs based on the above principles. These include, among other, TBUs that use p-channel devices at inputs, a larger number of n-channel or p-channel devices as well as TBUs that employ high-voltage depletion devices. More detailed information about prior art TBUs and associated applications and methods can be found in published literature including, in particular, PCT/AU94/00358; PCT/AU04/00117; PCT/AU03/00175; PCT/AU03/00848; PCT/AU03/01326 and U.S. Pat. No. 5,742,463 that are herein incorporated by reference.

Figure 3:
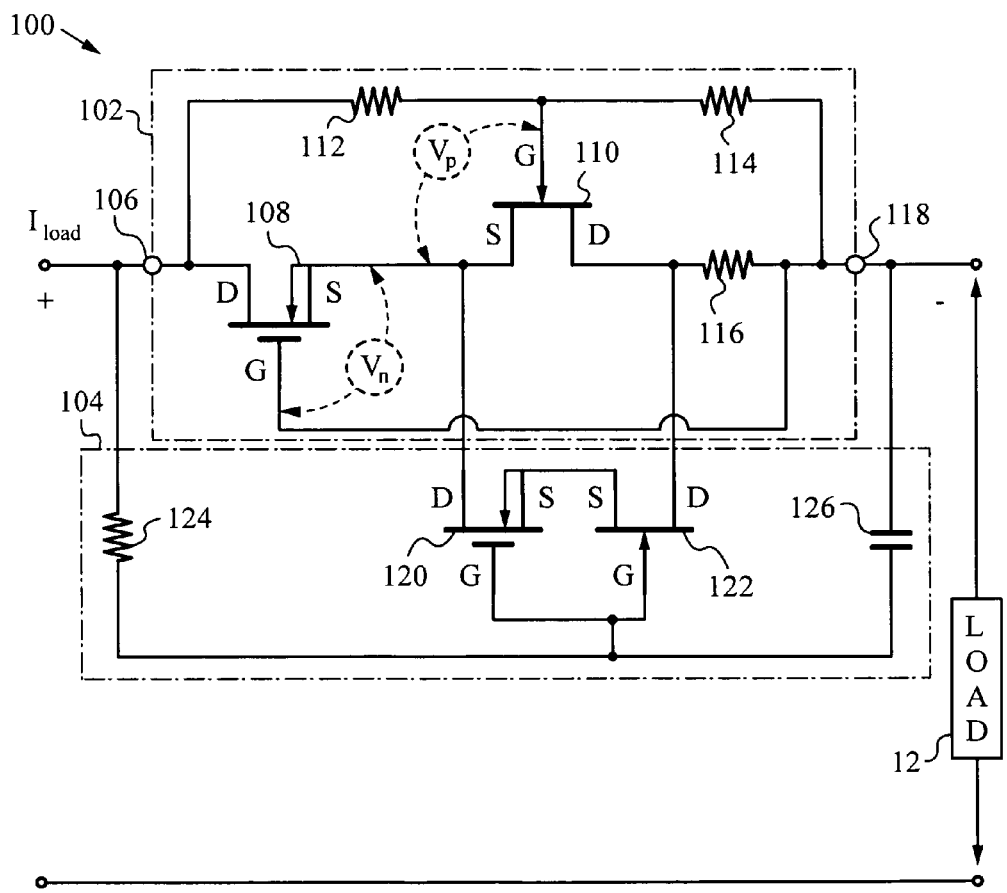
FIG. 3 is a diagram showing a uni-directional transient blocking apparatus in accordance with the invention.

FIG. 3 illustrates a uni-polar or uni-directional transient blocking apparatus 100 for blocking an over-voltage or transient in accordance with the invention. Apparatus 100 includes a transient blocking device 102 and a sampling circuit 104. Transient blocking device 102 has an input 106 at which a load current $I_{load}$ of positive polarity is applied and an output 118 at which load 12 is connected. A depletion mode n-channel device 108 is connected to input 106 by its drain D terminal. Preferably, device 108 is a high-voltage n-channel metal-oxide-semiconductor field effect transistor (MOSFET). In fact, in the embodiment shown, depletion mode n-channel MOSFET 108 is exposed to the maximum rated voltage of apparatus 100, and should thus have a voltage rating corresponding to the desired maximum rating.

MOSFET 108 is interconnected with a depletion mode p-channel device 110 source-to-source and gate-to-drain as shown. In the present embodiment p-channel device 110 is a PJFET. Two current limiters 112, 114 are used to ensure appropriate routing of current between MOSFET 108 and PJFET 110. Although in the present embodiment current limiters 112, 114 are resistors they can also be diodes, transistors, current sources or combinations thereof. An additional resistor 116 connected after drain D of PJFET 110 aids in controlling a voltage drop between drain D of PJFET 110 and gate G terminals of MOSFET 108.

Sampling circuit 104 has a voltage pinching element 120 and a disconnect element 122. In the present embodiment, voltage pinching element 120 is a MOSFET and disconnect element 122 is a PJFET. For proper operation, MOSFET 120 is chosen to have a lower pinch-off voltage than PJFET 122. MOSFET 120 and PJFET 122 are connected source-to-source and gate-to-gate, and they are also interconnected with MOSFET 108 and PJFET 110 of transient blocking device 102 as shown.

In the preferred embodiment, sampling circuit 104 is designed to sample any transient affecting apparatus 100 at a certain sampling time. To control the duration of the sampling time, circuit 104 has a timing control circuit made up of a resistor 124 and a capacitor 126. In fact, resistor 124 and capacitor 126 form an RC circuit whose time constant is dictated by the values of R and C, as is well known to those skilled in the art. The RC circuit is connected before input 106 and after output 118 of transient blocking device 102, such that it starts operating as soon as device 102 goes into blocked mode due to the arrival of a transient. The RC circuit is also connected to the gates of MOSFET 120 and PJFET 122 to control their states.

Apparatus 100 operates in a normal mode when no transient is present. Specifically, absent a transient resistances $R_n$, $R_p$ of MOSFET and PJFET 108, 110 are low since bias voltages $V_n$ and $V_p$ between their gate G and source S terminals are zero. At this time transient blocking device 102 is unblocked and devices 108, 110 act as small resistors that allow a load current $I_{load}$ to pass to load 12.

The appearance of a forward transient applies a negative bias $V_n$ to MOSFET 108 and positive bias $V_p$ to PJFET 110. That is because the interconnection of MOSFET and PJFET 108, 110 source-to-source and gate-to-drain reinforces the process of biasing both devices "off" in response to the transient. Specifically, as load current $I_{load}$ increases PJFET 110 develops a larger voltage drop across it, thus increasing negative bias $V_n$ applied to MOSFET 108 and consequently increasing the MOSFET's resistance. In turn, higher MOSFET resistance increases positive bias $V_p$ on PJFET 110 thereby increasing PJFET's resistance. Thus, the transient alters bias voltages $V_n$ and $V_p$ in concert, such that MOSFET and PJFET 108, 110 mutually increase their resistances and switch "off". This mutual pinch off process is responsible for transient blocking device 102 being placed in the blocked mode.

Once transient blocking device 102 is in the blocked mode, the RC circuit 124, 126 of sampling circuit 104 activates. Specifically, the voltage generated across transient blocking device 102 begins charging capacitor 126 through resistor 124. After a time determined by the RC time constant, a pinch-off voltage of MOSFET 120 is achieved. As a result, MOSFET 120 is turned on, since its pinch off voltage was selected to be lower than that of PJFET 122.

The interconnection of MOSFET 120 with PJFET 110 of transient blocking device 102 causes the turning on of MOSFET 120 to effectively short PJFET 110 across drain D and source S. Recall, however, that it is the voltage drop across PJFET 110 that biases MOSFET 108 off by applying bias voltage $V_n$. Thus, once PJFET 110 is shorted, the off bias on MOSFET 108 is removed and thus MOSFET 108 turns on too. As a result, transient blocking device 102 is unblocked and once again passes current $I_{load}$ from input 106 to output 118.

The unblocking of transient blocking device 102 by voltage pinching element or MOSFET 120 effectively starts a sampling time that is controlled by RC circuit 124, 126. During the sampling time, if the transient no longer affects apparatus 100, then transient blocking device 102 will once again pass load current $I_{load}$ to load 12 and the voltage drop between input 106 and 108 will be minimal. When this happens, RC circuit 124, 126 discharges capacitor 126 and entire apparatus 100 is reset. In other words, transient blocking device 102 is unblocked until the next transient forces mutual pinch off by PJFET 110 and MOSFET 108.

In the event the transient persists, PJFET 110 and MOSFET 108 will again mutually pinch off by the same mechanism as described above. Therefore, the unblocking of transient blocking device 102 by MOSFET 120 of sampling circuit 104 is only temporary in the event of a persistent transient. Furthermore, since in blocked mode transient blocking device 102 does not pass load current $I_{load}$ from input 106 to output 118 due to high resistance, sampling circuit 104 continues to see a significant voltage drop between input 106 and output 118.

The large voltage drop between input 106 and output 118 ensures that capacitor 126 of RC circuit 124, 126 continues to charge at the rate governed by the RC time constant. After the charging continues for a sampling time whose duration is set by the RC time constant, capacitor 126 will arrive at a charge level corresponding to the pinch off voltage of the disconnect element or PJFET 122. When this happens the disconnect element or PJFET 122 will bias off. Because of its interconnection with voltage pinching element or MOSFET 120 PJFET 122 will thus cause a permanent blocking of transient blocking device 102 at the end of the sampling time. It should be noted that once apparatus 100 is placed in the permanent blocking mode, it will require resetting by external intervention.

A person skilled in the art will recognize that proper selection of pinch off voltages of MOSFET 120, PJFET 122 and the values of resistance R of resistor 124 and capacitance C of capacitor 126 will permit adjustments to the operation of sampling circuit 104. Specifically, these parameters can be used to start the sampling time sooner or later after a transient first blocks transient blocking device 102 and to control the duration of the sampling time. For example, in environments where transients tend to be short-lived the parameters can be selected such that PJFET 120 unblocks transient blocking device 102 after a very short time. On the other hand, when expecting long transients that unblocking of transient blocking device 102 can be delayed and the sampling time can be extended.

Figure 4:
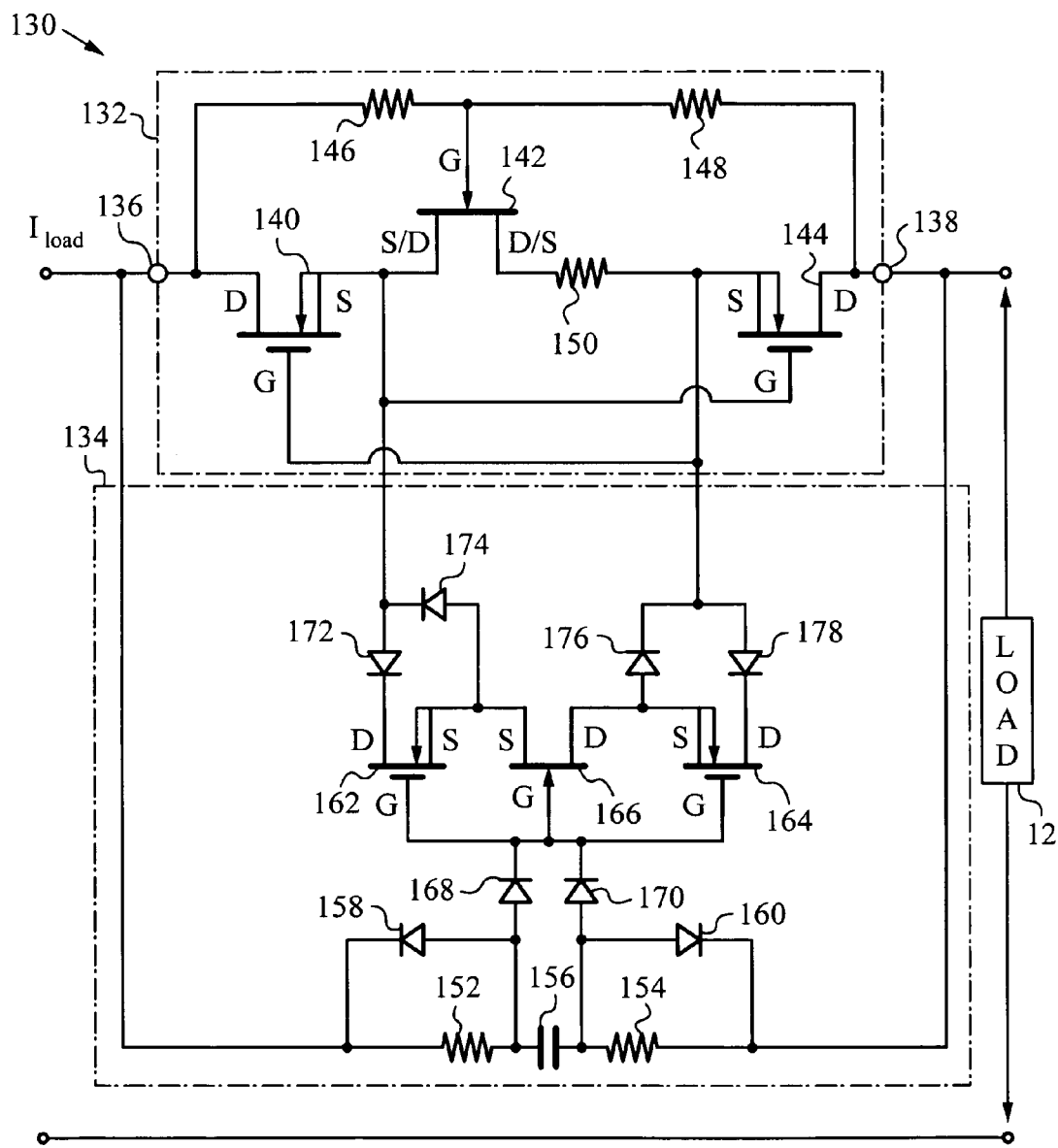
FIG. 4 is a diagram of a bi-directional transient blocking apparatus in accordance with the invention.

In some embodiments the transient blocking apparatus is bi-polar or bi-directional, meaning that it can block forward and reverse transients. One exemplary embodiment of such bi-directional apparatus 130 is shown in FIG. 4. Apparatus 130 has a bi-directional transient blocking device 132 and a corresponding bi-directional sampling circuit 134. Transient blocking device 132 has an input 136 at which a load current $I_{load}$ is applied and an output 138 at which load 12 is connected. A depletion mode n-channel device 140 is connected to input 136 by its drain D terminal. Preferably, device 140 is a high-voltage n-channel metal-oxide-semiconductor field effect transistor (MOSFET). MOSFET 140 is interconnected with a depletion mode p-channel device 142 source-to-source and gate-to-drain as shown. In the present embodiment p-channel device 142 is a PJFET.

For the purpose of blocking reverse transients, transient blocking device 132 has additional depletion mode n-channel device 144 that is interconnected with PJFET 142 source-to-source and gate-to-drain. Note that because the PJFET 142 is a symmetrical device, the gate and source are interchangeable, as indicated explicitly in the drawing, and this property is used for bi-directional blocking. Device 144 can be any suitable depletion mode n-channel device, such as a MOSFET. It should be noted that a large variety of embodiments of bi-directional transient blocking device 132 can be employed, as long as appropriate FETs exhibit suitable depletion or enhancement mode operation and have appropriate pinch off voltages.

Two current limiters 146, 148 are used to ensure appropriate routing of current between MOSFETs 140, 144 and PJFET 142. Although in the present embodiment current limiters 146, 148 are resistors they can also be diodes, transistors, current sources or combinations thereof. An optional resistor 150 connected after drain D of PJFET 142 aids in controlling a voltage drop between drain D of PJFET 142 and gate G terminals of MOSFET 140.

Sampling circuit 134 is interconnected with transient blocking device 132 between MOSFET 140, PJFET 142 and MOSFET 144. It further comprises an RC circuit with resistors 152, 154 and capacitor 156. Two diodes 158, 160 are provided to ensure appropriate routing of current to the RC circuit for charging capacitor 156 during transient of either polarity. Similarly to the above embodiment, RC circuit 152, 154, 156 plays the role of a timing control circuit designed to control the duration of the sampling time.

Sampling circuit 134 has two voltage pinching elements 162, 164 and a disconnect element 166. In the present embodiment, voltage pinching elements 162, 164 are MOSFETs and disconnect element 166 is a PJFET. For proper operation, MOSFETs 162, 164 are chosen to have a lower pinch-off voltage that PJFET 166. MOSFETs 162, 164 and PJFET 166 are interconnected as shown and proper polarity at their gates G is ensured by diodes 168, 170. Additional diodes 172, 174, 176 and 178 are provided to ensure proper polarities between MOSFETs 162, 164 and PJFET 166 as well as between sampling circuit 134 and transient blocking device 132.

When a forward transient occurs, transient blocking device 132 reacts with a mutual pinch off by MOSFET 140 and PJFET 142. On the other hand, when a reverse transient appears, transient blocking device 132 reacts with a mutual pinch off by MOSFET 144 and PJFET 142.

Once transient blocking device 132 is in the blocked mode, either due to a forward or reverse transient, RC circuit 152, 154, 156 of sampling circuit 134 activates by beginning to charge capacitor 156 through either resistor 152 or 154, depending on the polarity of the transient. After a time determined by the RC time constant, a pinch-off voltage of MOSFET 162 or MOSFET 164, again depending on transient polarity, is achieved. As a result, the corresponding MOSFET is turned on, since its pinch off voltage is lower than that of PJFET 166.

The interconnection of MOSFETs 162, 164 with PJFET 110 of transient blocking device 132 causes the turning on of MOSFET 162, 164, depending on transient polarity, to effectively short PJFET 142. The mutual biasing off condition in blocking device 132 is thus circumvented and device 132 is thus unblocked.

The unblocking of transient blocking device 132 by either voltage pinching element 162 or 164 effectively starts a sampling time that is controlled by the RC circuit. During the sampling time, if the transient no longer affects apparatus 100, then transient blocking device 102 will once again pass load current $I_{load}$ to load 12 and the voltage drop between input 136 and 138 will be minimal. When this happens capacitor 156 of the RC circuit discharges and entire apparatus 130 is reset. In other words, transient blocking device 132 is unblocked until the next transient forces mutual pinch off and corresponding blocking action to take place.

In the event the transient persists, PJFET 140 and the corresponding MOSFET 140 or 144, depending on transient polarity, will again mutually pinch off by the same mechanism as described above. Therefore, the unblocking of transient blocking device 132 by sampling circuit 134 is only temporary in the event of a persistent transient. Furthermore, when in blocked mode transient blocking device 132 produces a large voltage drop between input 136 and output 138. This large drop ensures that capacitor 156 continues to charge at the rate governed by the RC time constant. After the charging continues for a sampling time whose duration is set by the RC time constant, capacitor 156 will arrive at a charge level corresponding to the pinch off voltage of the disconnect element or PJFET 166. When this happens the disconnect element or PJFET 166 will bias off. Because of its interconnection with voltage pinching elements or MOSFETs 162, 164 PJFET 166 will cause a permanent blocking of transient blocking device 132 at the end of the sampling time. It should be noted that once apparatus 130 is placed in the permanent blocking mode, it will require resetting by external intervention.

Figure 5:
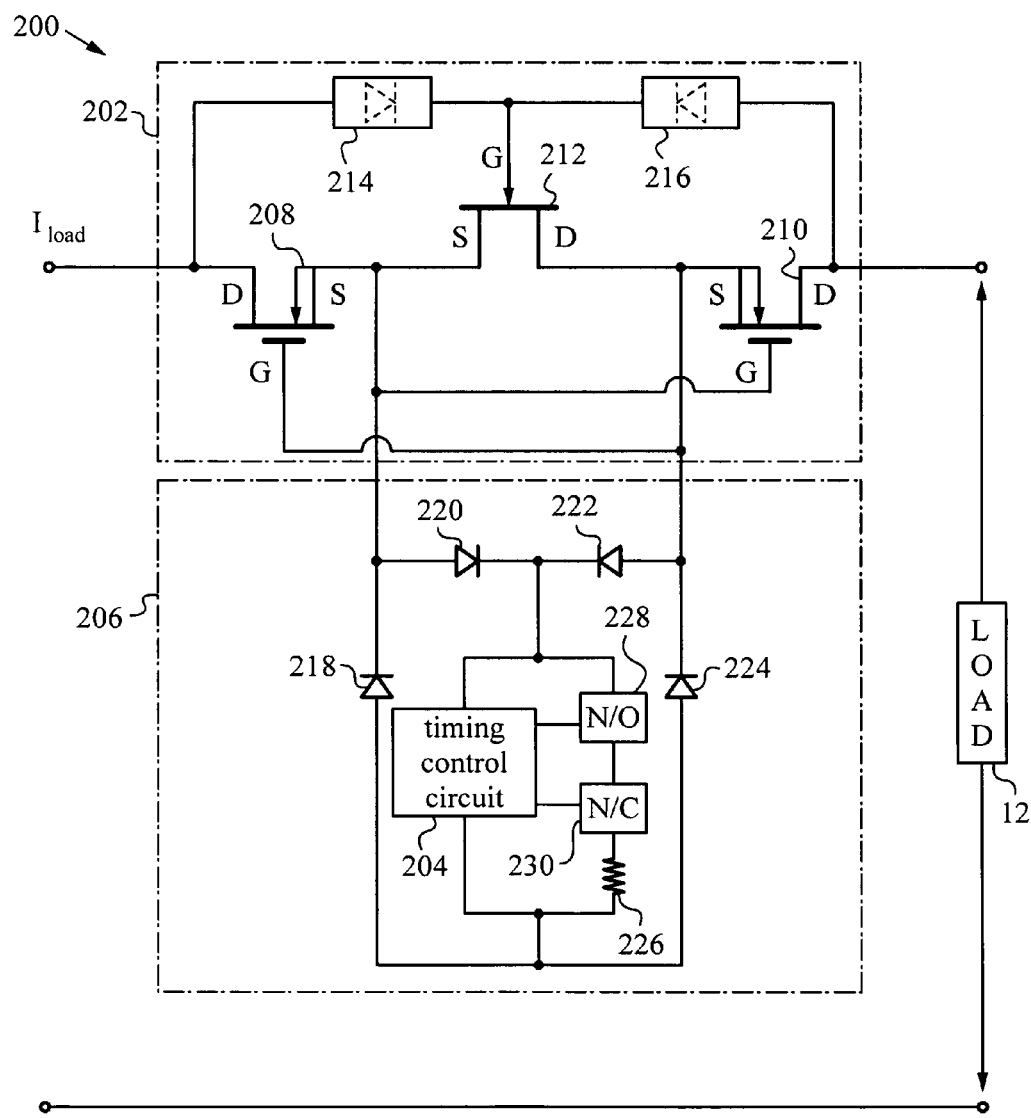
FIG. 5 is a diagram of another transient blocking apparatus according to the invention.

The method of invention can be practiced in many configurations and with various types of circuit components. For example, a transient blocking apparatus 200 with a transient blocking device 202 as shown in FIG. 5 employs a timing control circuit 204 in its sampling circuit 206 to integrate the function of voltage pinching and disconnect with sampling of the transient. Preferably, timing control circuit 204 is digital.

Apparatus 200 is bi-directional by virtue of employing a bi-directional blocking device 202. Device 202 uses two depletion mode n-channel devices 208, 210 and a depletion mode p-channel device 212 to effectuate mutual pinch off of p-channel device 212 and corresponding n-channel device 208 or 210, depending on transient polarity. Two current limiters 214, 216 are used to ensure appropriate routing of current between n-channel devices 208, 210 and p-channel device 212.

Depletion mode devices 208, 210, 212 of transient blocking device 202 are interconnected with sampling circuit 206 to enable a step of unblocking transient blocking device 202 in accordance with the invention. In particular, sampling circuit 206 is interconnected with transient blocking device 202 between n-channel device 208 and p-channel device 212 for unblocking transient blocking device 202 after the n- and p-channel devices 208, 212 have mutually pinched off in response to a forward transient. Similarly, sampling circuit 206 is interconnected between n-channel device 210 and p-channel device 212 for unblocking transient blocking device 202 after n- and p-channel devices 210, 212 have mutually pinched off during a reverse transient.

Sampling circuit 206 uses a set of four diodes 218, 220, 222 and 224 to preserve proper polarity between its timing control circuit 204 and transient blocking device 202. Timing control circuit 204 employs a resistor 226 in association with crowbar-type devices or switches to control sampling time duration as well as permanent blocking of transient blocking device 202. In the present embodiment, circuit 204 uses two switches, namely a normally open switch (N/O) 228 and a normally closed switch (N/C) 230. The interconnection between circuit 204 and switches 228, 230 enables circuit 204 to exercise control over the sampling and response to the transient.

During operation, when circuit 204 senses a high voltage $V_1$ across it that exceeds a threshold for longer than a certain time period $\tau_e$ then it knows that transient blocking device 202 has been blocked by a transient (of either polarity). In response, circuit 204 applies a control pulse to N/O switch 228 to cause it to close. Now, if the voltage across resistor 226 remains above a second threshold $V_2$ for a sampling time duration $\tau_s$, then circuit 204 knows that the transient is persistent. Therefore, circuit 204 terminates unblocking of transient blocking device 202 by removing the control pulse from N/O switch 228 and apparatus 200 is thus put in the permanently blocked mode. In case N/O switch 228 is of the crowbar type (e.g., embodied by a thyristor or the like), circuit 204 can achieve the same result by applying a control pulse to N/C switch 230 to cause it to open. In other words, the presence of N/C switch 230 is only required when working with crow-bar type switch 228, but is unnecessary if 228 is a device which can either be switched off and on at will, such as a DMOS FET transistor, or if the need to recognize a persistent transient and place the circuit in permanent blocking mode is unnecessary. This may occur in applications where it is known a priori that no persistent transients will be encountered. In these cases, sampling circuit 206 is used mainly for controlling the unblocking of transient blocking device 202 without permanent blocking option.

However, if the transient has passed, then the current through transient blocking device 202 is low and hence all voltage across sampling circuit 206 is removed. As a result there is no significant voltage drop over resistor 226 and permanent blocking is not triggered. At this point, circuit 204 can remove the control pulse from N/O switch 228, and, if previously triggered, from N/C switch 230 as well. This will reset sampling circuit 206 to initial state. Meanwhile, transient blocking device 202 remains in its fully-on mode.

Note that this in this embodiment, timing control circuit 204 together with resistor 226 and N/O and N/C switched 228, 230 exercises complete unblocking and blocking control over transient blocking device 202. The set of diodes 218, 220, 222, 224 effectively form a diode bridge in order to make sampling circuit 206 operated in bi-directional mode. Of course, either embodiment of FIG. 4 or the present embodiment would not require diode bridges if it were to operate in the uni-directional mode.

Among the many advantages of the method and apparatus with the reset function in response to short-lived transients is the feasibility of the circuit design and its compatibility with volume manufacturing. In fact, depending on the style of NMOS transistors used and the voltage rating of the apparatus all of the elements, the entire apparatus can be integrated in one die.

A system employing any apparatus in accordance to the invention can be applied to protect load 12 from transients. In particular, the apparatus of invention, both in its uni-directional and bi-directional embodiments has the requisite protection characteristic to be used with sensitive load 12. For example, load 12 can be a telephonic circuit, an opto-electronic circuit or any high-fidelity circuit in general. A person skilled in the art will be able to determine the protection parameters and further adapt the apparatus of invention to any particular system that requires highly reliable and robust transient protection.

Many other embodiments of the apparatus and method are possible. Therefore, the scope of the invention should be judged by the appended claims and their legal equivalents.

I claim:

1. A transient blocking apparatus comprising:
   a) a transient blocking device having at least one depletion mode n-channel device interconnected in series with at least one depletion mode p-channel device such that a transient alters a bias voltage $V_p$ of said depletion mode p-channel device and a bias voltage $V_n$ of said depletion mode n-channel device, whereby said depletion mode p-channel device and said depletion mode n-channel device mutually switch off to block said transient;
   b) a sampling circuit interconnected with said depletion mode p-channel device for unblocking said transient blocking device;
   wherein said sampling circuit samples said transient at a sampling time; and
   wherein said sampling circuit comprises a voltage pinching element interconnected with said p-channel device for shorting said depletion mode p-channel device at the start of said sampling time.

2. The transient blocking apparatus of claim 1, wherein said sampling circuit comprises an RC circuit for controlling a duration of said sampling time.

3. The transient blocking apparatus of claim 1, wherein said voltage pinching element comprises a depletion mode n-channel element.

4. The transient blocking apparatus of claim 1, wherein said sampling circuit comprises a disconnect element interconnected with said voltage pinching element for permanently blocking said transient blocking device at the end of said sampling time when said transient persists.

5. The transient blocking apparatus of claim 4, wherein said disconnect element comprises a depletion mode p-channel device.

6. The transient blocking apparatus of claim 1, further comprising an RC circuit for controlling a duration of said sampling time.

7. The transient blocking apparatus of claim 1, further comprising an additional depletion mode n-channel device interconnected in said transient blocking device for rendering said transient blocking apparatus bi-directional for blocking a reverse transient.

8. The transient blocking apparatus of claim 1, wherein said sampling circuit comprises a timing control circuit for controlling the sampling of said transient.

9. The transient blocking apparatus of claim 8, wherein said timing control circuit comprises a digital timing control circuit further comprising an unblocking and blocking control for said transient blocking device.

10. A method for transient blocking comprising:
    a) providing a transient blocking device having at least one depletion mode n-channel device and at least one depletion mode p-channel device interconnected in series such that a transient alters a bias voltage $V_p$ of said depletion mode p-channel device and a bias voltage $V_n$ of said depletion mode n-channel device, whereby said depletion mode p-channel device and said depletion mode n-channel device mutually switch off to block said transient;
    b) interconnecting a sampling circuit with said depletion mode p-channel device; and
    c) unblocking said transient blocking device;
    wherein said unblocking comprises shorting said depletion mode p-channel device with a voltage pinching element.

11. The method of claim 10, further comprising sampling said transient at a sampling time.

12. The method of claim 11, further comprising controlling a duration of said sampling time.

13. The method of claim 12, wherein said duration of said sampling time is controlled by an RC circuit.

14. The method of claim 12, wherein said duration of said sampling time is controlled by a digital timing control circuit.

15. The method of claim 10, further comprising permanently blocking said transient blocking device when said transient persists.

16. The method of claim 10, further comprising interconnecting an additional depletion mode n-channel device with said transient blocking device for rendering said transient blocking apparatus bi-directional for blocking a reverse transient.

* * * * *